United States Patent [19]

Rohrmann

[11] 4,269,817
[45] * May 26, 1981

[54] PRODUCTION OF CHLORINE FROM CHLORIDE SALTS

[75] Inventor: Charles A. Rohrmann, Kennewick, Wash.

[73] Assignee: Battelle Memorial Institute, Richland, Wash.

[*] Notice: The portion of the term of this patent subsequent to Aug. 15, 1995, has been disclaimed.

[21] Appl. No.: 61,406

[22] Filed: Jul. 27, 1979

[51] Int. Cl.$^3$ .............................................. C01B 7/04
[52] U.S. Cl. .................... 423/502; 423/482; 423/507; 423/549; 423/552; 423/DIG. 12
[58] Field of Search .............. 423/481, 482, 659, 502, 423/504, 506, 549, 552, DIG. 12

[56] References Cited

U.S. PATENT DOCUMENTS

| 308,511 | 11/1884 | Mond | 423/482 |
|---|---|---|---|
| 1,145,898 | 7/1915 | Howard | 423/482 |
| 2,204,888 | 6/1940 | Dougherty | 423/552 X |
| 2,381,908 | 8/1945 | Hurt et al. | 423/535 X |
| 3,131,028 | 4/1964 | Stow, Jr. | 423/502 |
| 3,363,977 | 1/1968 | Redniss | 423/482 |
| 3,552,921 | 1/1971 | Blytas | 423/210.5 |
| 3,917,797 | 11/1975 | Reed et al. | 423/210.5 |
| 4,107,280 | 8/1978 | Rohlmann | 423/502 |

FOREIGN PATENT DOCUMENTS 1240832 5/1967 Fed. Rep. of Germany .......... 423/502

Primary Examiner—Earl C. Thomas
Attorney, Agent, or Firm—Klarquist, Sparkman, Campbell, Leigh, Whinston & Dellett

[57] ABSTRACT

A process for converting chloride salts and sulfuric acid to sulfate salts and elemental chlorine is disclosed. A chloride salt and sulfuric acid are combined in a furnace where they react to produce a sulfate salt and hydrogen chloride. Hydrogen chloride from the furnace contacts a molten salt mixture containing an oxygen compound of vanadium, an alkali metal sulfate and an alkali metal pyrosulfate to recover elemental chlorine. In the absence of an oxygen-bearing gas during the contacting, the vanadium is reduced, but is regenerated to its active higher valence state by separately contacting the molten salt mixture with an oxygen-bearing gas.

6 Claims, 3 Drawing Figures

PRODUCTION OF CHLORINE FROM CHLORIDE SALTS

BACKGROUND OF THE INVENTION

The present invention relates to the production of two valuable commodities, elemental chlorine and sulfate salts, from more abundant chloride salts and sulfuric acid. More specifically, it is a process which can be conducted with an energy input primarily of heat energy instead of electrical energy.

Presently, the method of choice for obtaining chlorine from a chloride salt requires electrolysis of the salt in an aqueous solution. This process requires extensive amounts of scarce electrical energy. To operate in an energy-efficient manner, it is thus necessary that an electrolysis plant be located adjacent to a source of low cost electrical energy. But, it is unusual to find existing sources of electrical energy near a source of raw chloride salts, Therefore, to establish a new electrolysis plant, it is usually necessary to construct the plant near an existing source of electrical energy and to expend substantial amounts of energy to transport the chloride salts to the plant or to make a substantial capital and energy investment in new electrical generation capacity and/or new transmission lines to make sufficient low cost electrical energy available to an electrolysis plant constructed near the site where the chloride salts are to be obtained.

Furthermore, the conversion of thermal energy to electrical energy for use in an electrolysis process involves a substantial loss in usable energy. This loss is further magnified if long distance transmission lines are required.

Also, electrolysis processes cannot be used unless the raw material chloride salt is of high purity. Most naturally-occurring salts thus require purification treatments before they can be used in a conventional electrolysis process.

There is a limited number of input raw materials suitable for use in an electrolysis process; and the byproducts which result from certain electrolyzed input materials are difficult to market or to dispose of in an environmentally sound manner.

SUMMARY OF THE INVENTION

The present invention is a simple method of obtaining elemental chlorine from chloride salts without the above difficulties of conventional electrolysis processes. In a first reaction zone, a chloride salt and sulfuric acid are combined and heated to produce a sulfate salt and hydrogen chloride. The sulfate salt is collected as a valuable product. In a second reaction zone, the hydrogen chloride is oxidized by contact with a molten sulfate salt mixture to produce elemental chlorine and water.

The process requires no input of electrical energy, except for incidental amounts to operate components such as pumps and lights, while producing only valuable products and environmentally harmless waste.

Because the energy requirement is thermal, the combustion of coal, lignite, peat or biomass resources can provide the major energy requirement.

As compared to an electrolysis process, raw material purity is much less critical when chlorine is produced by the process of the present invention. Because the hydrogen chloride, produced in the first reaction zone of the present process, is essentially moisture free, it is readily adapted for reaction in the second zone without intermediate concentration steps.

In the present process, reaction in the first zone is conducted at a substantially higher temperature than required for reaction in the second zone, so it is possible to recover heat energy from gases produced in the first zone and to use that energy for maintaining an elevated temperature in the second zone thereby minimizing the heat energy requirement of the process.

By selecting any of several suitable input raw materials, it is possible to obtain any of several desirable sulfate salts as coproducts with elemental chlorine.

The process requires only input raw materials which ultimately contribute to marketable end products. There are no processing intermediates which must be discarded after use. Those substances not consumed during the process, such as the sulfate salt mixture used in the second zone, are continuously recycled and rarely if ever need to be replenished.

The process of the present invention is further advantageous because sulfuric acid may be an increasingly prevalent commodity as flue gas desulfurization processes come on line to meet environmental protection requirements. The present process provides an attractive means to utilize this potentially plentiful resource.

It is an object of this invention to provide a process for recovering chlorine from chloride salts without more than inconsequential consumption of electrical energy.

A further object is to provide such a process which is simple and requires a minimum of controls and apparatus.

Accordingly it is an object to provide a system wherein the input raw materials and intermediate products need not be subjected to major purification or concentration treatments.

Another object is to provide a system which maximizes the use of energy.

A further object is to provide a system wherein a sulfate coproduct is produced along with chlorine, and specifically to provide a process wherein the composition of the coproduct may be determined by choice of input raw materials.

These and other objects and advantages of the present invention will become apparent upon reading the following specification.

DESCRIPTION OF PREFERRED EMBODIMENTS

Figure 1:
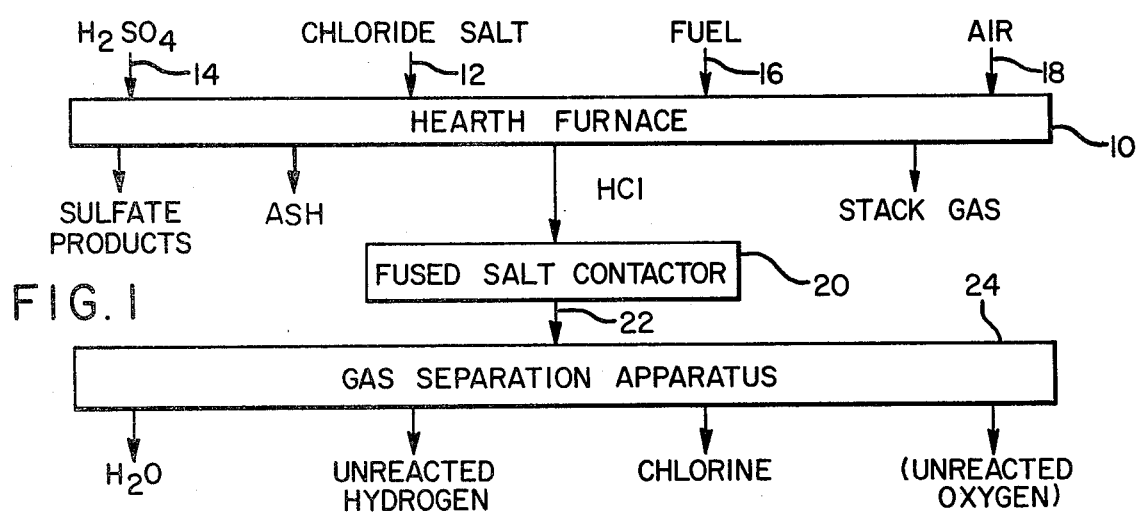
FIG. 1 is a schematic flow diagram showing a general embodiment of the process of the present invention.

Referring to FIG. 1, the general process for the production of chlorine and sulfate salts from sulfuric acid and chloride salts is shown. Sulfuric acid and a chloride salt, such as sodium chloride, potassium chloride or ammonium chloride, are fed into a first reaction zone 10 via a line 14 and a feed apparatus 12 respectively. If purity of the sulfate salt product is not a primary goal, e.g. where chlorine production is of paramount importance, a mixed chloride salt such as sylvinite can be fed to the reaction zone 10.

The zone 10 comprises a furnace wherein the combined reactants are heated to an elevated temperature which is less than the fusion temperature of the charge. Unless the chloride salt includes ammonium chloride, the furnace should be maintained at a temperature in the range of 800° C. to 843° C., most preferably about 840° C. When ammonium chloride is present, the furnace should be operated at a temperature sufficiently low that the (NH$_4$)$_2$SO$_4$ is not decomposed.

Advantageously, the furnace 10 is fired by fuel, such as coal, supplied to the combustion chamber via a fuel feed apparatus 16. The fuel is burned in the presence of air supplied through a line 18.

When contacted in the furnace, the chloride salt and sulfuric acid react according to the following reaction:

$$2X\,Cl + H_2SO_4 \rightarrow X_2SO_4 + 2HCl \qquad (1)$$

X = a cationic substance such as Na, NH$_4$, K

The products of this reaction are solid sulfate salts which may be used in wood pulp or fertilizer production or for other useful purposes, ash from the fuel employed, hot stack gas from which heat energy can be extracted and hot, dry hydrogen chloride gas which is fed to second reaction zone inside a fused salt contactor 20. Inside the contactor, the hydrogen chloride gas is contacted with a molten salt mixture so that the hydrogen chloride is oxidized according to the following general reaction:

$$2HCl + \tfrac{1}{2}O_2 \rightarrow H_2O + Cl_2 \qquad (2)$$

Kinetics do not allow the reaction according to equation (2) to proceed to completion. For this reason, the effluent gas mixture leaving the salt contactor 20 in a line 22 contains a mixture of steam, unreacted hydrogen chloride and chlorine gas. Under certain circumstances described below, the mixture may also contain some oxygen gas. The gasses of the mixture are separated by conventional gas separation apparatus 24.

Most preferably, the chloride salt introduced into the furnace 10 via the feed apparatus 12 will comprise sodium chloride, ammonium chloride, or potassium chloride. The chloride salt and sulfuric acid will be combined in a substantially stoichiometric ratio, i.e. a molar ratio of about 2:1. For most economic operation a slight excess of the least expensive raw material can be included to maximize utilization of the more expensive raw material.

The furnace 10 will preferably comprise a hearth furnace. One especially suitable furnace for continuous operation is the circular style of hearth furnace commonly known as the Mannheim furnace. Such furnaces are typically used to react sulfuric acid with sodium chloride to produce salt cake and hydrochloric acid.

A Mannheim furnace consists of a refractory hearth located beneath a silicon carbide arch. Hot flue gasses are circulated over the arch so that heat is transmitted through the arch and radiated to the product on the hearth. Input raw materials are mixed and charged continuously to the center of the hearth where they are maintained in solid form and are stirred by rotating arms. The charge is gradually worked toward the periphery as the reaction generates hydrogen chloride gas. The gas is discharged through an opening in the arch while the salt cake is discharged at the periphery of the hearth.

A salt composition suitable for use in the salt contactor 20 includes alkali metal sulfates, alkali metal pyrosulfates and a dissolved oxygen compound which is capable of reacting with the hydrogen chloride to produce elemental chlorine. The preferred oxygen compound is V$_2$O$_5$ which is included in the salt mixture up to the extent that it will dissolve in the melt. Preferably V$_2$O$_5$ comprises 2 to 25 weight percent of the salt mixture and more preferably 10 to 15 weight percent.

Other soluble metal oxides, used in combination with V$_2$O$_5$, may assist in the oxidation of hydrogen chloride in the contactor 20. These include soluble oxides of copper, iron, chromium or manganese. Less suitable are oxides of lead, nickel, cobalt or uranium.

A variety of different alkali metal sulfates and pyrosulfates may be chosen to make up the bulk of the mixture. Normal sulfates and pyrosulfates of potassium and sodium are preferred due to their abundance and favorable characteristics. A mixture containing 5 to 25 weight percent of potassium sulfate and 50 to 90 weight percent potassium pyrosulfate is satisfactory. The preferred range of these sulfates is 10 to 20 weight percent potassium sulfate and 65 to 70 weight percent potassium pyrosulfate.

Small amounts of any other sulfate or pyrosulfate may be added to such a mixture of potassium compounds without greatly reducing the effectiveness of the salt mixture. In addition, the inclusion of small amounts of lithium sulfate, sodium sulfate or sulfuric acid have been found to have a desirable effect on the freezing temperature, corrosivity, SO$_3$ vapor pressure, viscosity, and operating temperature range of the salt mixture. The combined amounts of these substances in the salt mixture should not substantially exceed 10 weight percent. Additions beyond this amount are found to be either undesirable or unfeasible.

When this preferred mixture is used, hydrogen chloride from the furnace 10 is oxidized when the salt is maintained in the temperature range of 275° C. to 475° C. The best results are achieved in the temperature range of 325° C. to 425° C. If gaseous hydrogen chloride is contacted with the salt mixture in this temperature range for at least 0.25 seconds, and preferably for between 0.5 and 5.0 seconds, a substantial amount of hydrogen chloride will be oxidized to chlorine according to the reaction of equation (2).

Sodium sulfate and sodium pyrosulfate can be substituted for all or part of the potassium sulfate and potassium pyrosulfate in the above described salt mixture. The resulting mixture will perform suitably, but will be somewhat less thermally stable and less catalytically active than the preferred mixture of potassium salts.

A FIRST SPECIFIC EMBODIMENT

Figure 2:
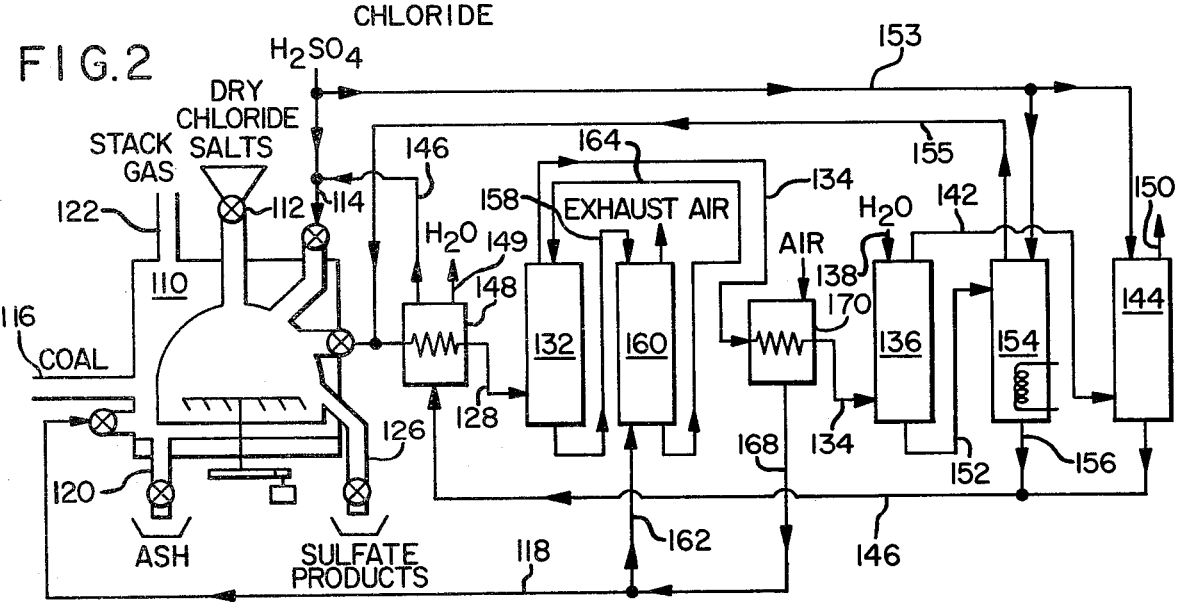
FIG. 2 is a schematic flow diagram showing a first specific embodiment of the process shown in FIG. 1.

A first specific embodiment of the present invention is disclosed in FIG. 2. This drawing shows a Mannheim furnace 110 with an interior hearth into which is fed a stream of dry chloride salts through an airlock feed device 112. By a separate line 114, sulfuric acid is fed into the interior of the furnace 110 where it is combined with the chloride salts on the hearth.

Coal is supplied to the combustion chamber of the furnace 110 via a suitable conveyor 116 and is combusted with oxygen from air supplied through a line 118. Ash from the combustion of coal is discharged through an outlet 120; and combustion gasses are vented to the atmosphere via a stack 122.

Inside the inner chamber of the furnace 110, the chloride salts and sulfuric acid react to form sulfate products and substantially dry hydrogen chloride according to reaction of equation (1). The sulfate products are discharged through an outlet 126 and collected. Meanwhile, the hydrogen chloride gas is exhausted through a line 128 which conveys the gas to the interior of a fused salt contactor 132, wherein the hydrogen chloride gas is contacted with the above described molten salt mixture including $V_2O_5$ which oxidizes the hydrogen chloride according to the generally assumed reaction:

$$2HCl + V_2O_5 \rightarrow V_2O_4 + Cl_2 + H_2O \tag{3}$$

Thus, in the first specific embodiment, oxygen for the reaction according to equation (2) is derived from the vanadium pentoxide component which is dissolved in the molten salt mixture.

The ratio at which hydrogen chloride and molten salt are combined in the salt contactor 132 has an effect on the overall efficiency of the system. The preferred ratio will depend on the salt composition and operating temperature, but may be easily determined by experimentation.

The effluent gas leaving the contactor 132 via a line 134 contains substantial amounts of water vapor and chlorine along with some residual hydrogen chloride, but without free oxygen or other gasses except those which may enter by leakage.

Any unreacted hydrogen chloride and a majority of the water vapor in the effluent gas stream may be removed by means of a condenser 136. In the condenser, the effluent gas stream is cooled until the water vapor condenses and dissolves the hydrogen chloride to form hydrochloric acid. If the amount of water obtained from the effluent gas is insufficient to dissolve all the hydrogen chloride, some make up water may be added to the condensed water vapor inside the condenser 136 via a line 138.

The gas mixture leaving the condenser 136 through a line 142 consists of chlorine and a small residual amount of water vapor. These gases are scrubbed in a sulfuric acid scrubber 144 where the residual water vapor is absorbed by countercurrent contact with a stream of sulfuric acid. As the sulfuric acid passes through the scrubber 144 it becomes diluted with water. The diluted acid may be passed via a line 146 through a heat exchange concentrator 148 where it is heated by hydrogen chloride passing through the line 128. From the concentrator 148, the concentrated acid is piped to the line 114 so that it can enter the furnace 110 as a portion of the raw material sulfuric acid. Heating in the concentrator 148 will cause evaporation of most of the dilution water in the dilute sulfuric acid solution. This water vapor is vented into the atmosphere in a line 149. The gas which leaves the sulfuric acid scrubber 144 via a line 150 is substantially pure chlorine gas which may be liquified for transport or may be used directly in gaseous form for a variety of industrial purposes.

The hydrochloric acid produced in the condenser 136 is passed in a line 152 into a hydrochloric acid dehydrator 154, where it is contacted with a stream of sulfuric acid supplied from a line 153, to separate water from the hydrogen chloride. The mixture inside the dehydrator 154 is heated to produce a gaseous effluent containing hydrogen chloride and a minimum of water vapor. The remainder of the mixture leaves the dehydrator 154 as a liquid effluent of dilute sulfuric acid. The dilute sulfuric acid effluent is carried from the dehydrator 154 in a line 156 and is combined in the line 146 with the dilute sulfuric acid effluent from the sulfuric acid scrubber 144. The gaseous effluent from the dehydrator 154 is piped via a line 155 to the line 128 at a location upstream of the concentrator 148 for recirculation through the contactor 132.

It is important that the water content of gas in line 128 be low because excess water in the salt contactor 132 will drive the reaction of equation (2) to the left and thus impede the formation of the chlorine. Fortunately, hydrogen chloride produced in the furnace 110 and carried by the line 128 is sufficiently dry that the production of chlorine is not adversely effected. The hydrogen chloride dehydrater 154 should be selected, however, to produce a substantially dry hydrogen chloride gas if hydrogen chloride from that source is to be injected into the line 128.

Because the valance state of the vanadium in the salt mixture is reduced when hydrogen chloride is oxidized in the fused salt contactor 132 according to the reaction of equation (3), it is necessary to regenerate the vanadium to its higher valance state so it can be reused. Such a regeneration is accomplished by transporting a stream of the molten salt, which contains reduced vanadium, through a line 158 into a second fused salt contactor 160 where it is contacted with an oxygen-bearing gas, such as air, introduced from a line 162. The vanadium is thereby oxidized to regenerate the $V_2O_5$ according to the following general reaction:

$$V_2O_4 + \tfrac{1}{2}O_2 \rightarrow V_2O_5 \tag{4}$$

A stream of the regenerated molten salt, which now includes vanadium in its high valance state, leaves the contactor 160 in a line 164 and is returned to the salt contactor 132 for reuse.

Air is the preferred oxygen-regenerating gas, due to its ready availability and low cost. The air is circulated through the salt contactor 160 and then vented directly to the atmosphere. Oxygen is another suitable gas. It is used most efficiently if the unreacted fraction of the oxygen leaving the contactor 160 is returned to the line 162 for reuse.

To minimize the energy requirements of this system, it is helpful if the air admitted to the furnace 110 and contactor 160 via lines 118 and 162 respectively, be preheated. For this purpose, a single air source line 168 can be used to supply heated air to both lines 118 and 162. The air may be preheated by means of a heat exchange apparatus 170 which scavanges heat from the effluent gasses traveling through line 134. Another heat exchanger (not shown) could be used to scavange heat from gasses in the stack 122.

Assuming conservatively, that a yield of 96% can be obtained from the system, 2,000 pounds of chlorine gas and 4100 pounds of sodium sulfate would be produced from each 3400 pounds of sodium chloride and 3100 pounds of sulfuric acid fed into the furnace. Typical Mannheim furnaces operate at 96% efficiency and experimental data indicate that similar yields could be expected for the complete system.

Assuming most conservatively, that 60% conversion of hydrogen chloride from the furnace 110 is achieved, the effluent gas leaving the salt contactor 132 would contain by volume about:

| | |
|---|---|
| 30% | Cl$_2$ |
| 30% | H$_2$O |
| 40% | HCl |

EXAMPLE 1

A series of experiments was conducted to determine whether efficient conversion of hydrogen chloride from the furnace 110 to chlorine could be accomplished according to this embodiment of the present invention. In these experiments Vycor vessels positioned inside tube furnaces were used to contain the molten salt mixture which included $K_2S_2O_7$, $K_2SO_4$ and $V_2O_5$. A metered stream of hydrogen chloride was dispersed into the molten catalyst mixture by means of a Pyrex frit, and effluent gas leaving the vessel was scrubbed with a KI solution to remove the chlorine formed and any residual HCl present. Each run was one hour long. During the runs, the vanadium was successfully regenerated whenever the apparent HCl conversion diminished by about 50%. Regeneration was accomplished by stopping the flow of hydrogen chloride and then dispersing air into the salt mixture via the frit.

At the conclusion of each run, the total chlorine formed was determined by titrating the free iodine in the scrubber solution with sodium thiosulfate. The amount of unreacted hydrogen chloride was determined by titrating the scrubber solution with sodium hydroxide. The results of the various runs are presented in Table I. As these results show, substantial yields were obtained when sufficient $V_2O_5$ was present, even though conditions were not optimized and the experimental apparatus was quite simple.

TABLE I

| | Conversion of HCl to Chlorine | | | |
|---|---|---|---|---|
| Run No. | Reaction Temp (°C.) | Cl Injected as HCl (g.) | Cl recovered as Cl$_2$ (g.) | Composition of salt$_a$ | Conversion (%)$_b$ |
| 1 | 375 | 20.00 | 10.424 | A | 52.12 |
| 2 | 375 | 6.16 | 4.078 | A | 66.20 |
| 3 | 400 | 14.752$_c$ | 2.386 | B | 16.17 |
| 4 | 400 | 35.824$_c$ | 6.281 | B | 17.53 |

$_a$Salt compositions:
A = 80% K$_2$S$_2$O$_7$ (400.0g),
10% K$_2$SO$_4$ (50.0g),
10% V$_2$O$_5$ (50.0g).
B = 85% K$_2$S$_2$O$_7$ (314.5g),
5% K$_2$SO$_4$ (18.5g),
10% V$_2$O$_5$ (37.0g).

$_b$Conversion is calculated for the total run. Significant variations between individual samples were observed throughout the runs. Regeneration with air was initiated when the apparent HCl conversion diminished by about 50%.
$_c$HCl feed gas was diluted with nitrogen.

A SECOND SPECIFIC EMBODIMENT

Figure 3:
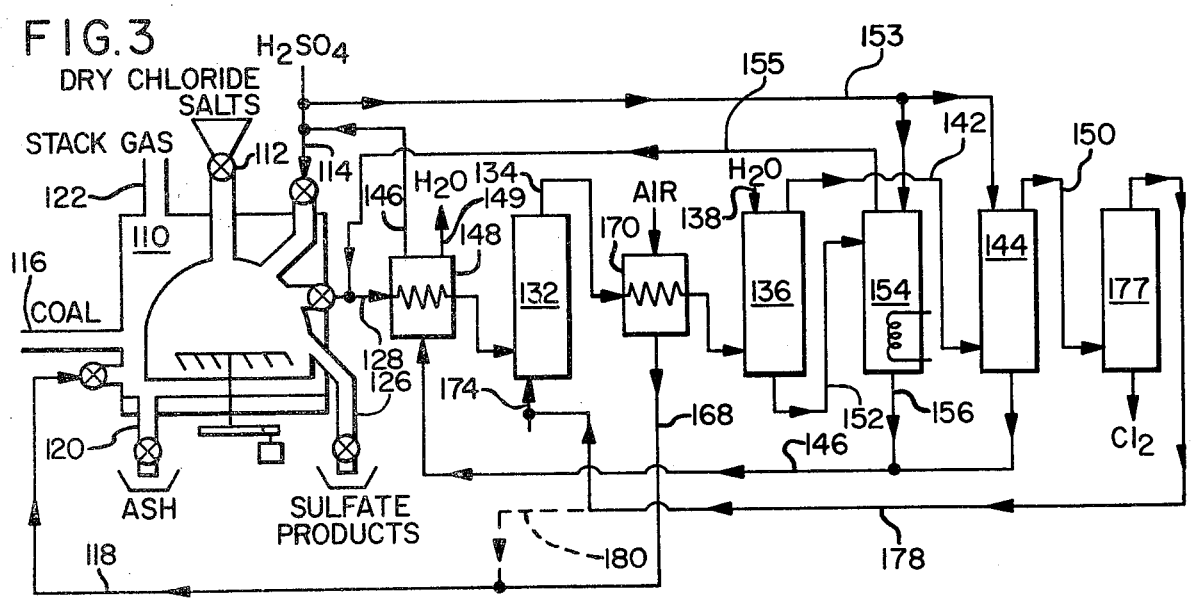
FIG. 3 is a schematic flow diagram showing a second specific embodiment of the process shown in FIG. 1.

Another specific embodiment is shown in FIG. 3 of the drawing. This drawing is similar in many respects to the drawing shown in FIG. 2 and elements which the two embodiments have in common have been given the same reference number in both figures. The most significant difference between the systems is the manner in which the hydrogen chloride in line 128 is treated after it leaves the Mannheim Furnace 110.

In this embodiment, hydrogen chloride gas in the line 128 is injected into the salt contactor 132 where it is combined with a metered stream of an oxygen-bearing gas introduced through a line 174. Together, the gasses are contacted with the molten salt mixture which catalyzes the oxidation of the hydrogen chloride according to the reaction of equation (2).

An effluent gas leaves the contactor 132 via the line 134 as previously described, but in this instance will contain additional gaseous substances. If the oxygen-bearing gas introduced through the line 174 is primarily oxygen, the effluent will include substantial amounts of water vapor and chlorine along with some residual hydrogen chloride and oxygen. If air is used as the oxygen-bearing gas, the effluent will also include a substantial amount of nitrogen.

The hydrogen chloride and majority of water vapor in the effluent gas stream are removed by means of the condenser 136. In the condenser, the effluent gas stream is cooled until the water vapor condenses and dissolves the hydrogen chloride to form hydrochloric acid as previously described.

The mixture leaving the condenser 136 through the line 142 includes oxygen, chlorine and a small residual amount of water vapor. These gases are scrubbed in a sulfuric acid scrubber 144 to remove the water vapor. The gas mixture which leaves the sulfuric acid scrubber 144 via the line 150 contains oxygen and chlorine and is suitable for many industrial uses, such as bleaching of paper pulp, without further treatment.

If a supply of liquid chlorine is desired, however, chlorine may be isolated in a condenser 177 which cools the gas mixture to liquify the chlorine. A gas stream leaving the condenser 177 contains oxygen and a residual fraction of uncondensed chlorine gas. This stream may be returned in a line 178 to the line 174 for reintroduction into the contactor 132. Alternatively, if the gas stream leaving the condenser 177 does not contain an excessive amount of chlorine, the stream may be combined with the heated air in line 168, as illustrated by broken line 180, and fed to the combustion chamber of the furnace 110 through the line 118. Preferably, the line 178 will be connected to the line 174 so that residual chlorine will be recycled instead of lost to the atmosphere.

To accomplish recycling through the line 178, substantially pure oxygen must be used as the oxygen-bearing gas for the second specific embodiment. If air is used, nitrogen and other non-reacting components in the air are carried through the condenser 136, sulfuric acid scrubber 144, and condenser 177 along with any unreacted oxygen gas. The gas mixture leaving the condenser 177 thus includes all the gaseous components of the air introduced through the line 174, except that a substantial amount of the oxygen has been removed. It is not advantageous to recycle this mixture to the salt mixture via the line 174, because the ratio of nitrogen to oxygen would continuously increase and rapidly reach intolerable levels. Disposal of such a mixture may thus be necessary, but would reduce the overall efficiency of the second specific embodiment because a fraction of regenerated chlorine would be lost.

The nitrogen-laden gas mixture can itself be a useful product if conditions in the condenser 177 are adjusted so the gasses leaving the condenser contain a significant amount of chlorine. Such a chlorine-containing mixture can be used in a chlorination operation or directly for the production of chlorine products such as inorganic chlorides, hypochlorites or certain other organic chlorides.

If air is used in place of oxygen and is injected into the salt contactor 132 via the line 174, the line 174 may be connected to the line 168 (not shown) so that air entering the salt contactor 132 is preheated by the heat exchange apparatus 170. Likewise, air could be preheated in a heat exchange (not shown) connected to the stack 122.

For maximum efficiency of the second specific embodiment, it is necessary that oxygen and hydrogen chloride be fed to the salt contactor 132 in a proper ratio. The stoichiometric ratio of hydrogen chloride to oxygen, according to equation (2), is four moles of hydrogen chloride to one mole of oxygen gas. under most actual operating conditions, it is preferable to have an excess of oxygen. Assuming that the feed stock gases are substantially pure, a ratio of between 3.3 and 3.7 moles of hydrogen chloride per each mole of oxygen is preferred with a ratio of 3.5 being the most preferred.

In some applications it may be desirable to operate with a deficiency of oxygen in the feed stock so that the effluent gasses contain very little oxygen. Such operation would be advantageous because chlorine could be more easily separated from the second specific embodiment effluent gases if they would contain a minimum of oxygen. This is because oxygen is more difficult to remove from a gas mixture than is hydrogen chloride. It would be disadvantageous because the efficiency of the hydrogen chloride oxidation would be reduced and additional hydrogen chloride recycle capacity would be required.

The chlorine yield of the process according to the second specific embodiment would be slightly less than the amount stated previously for the first specific embodiment if air is used for oxidation. This is because the oxidation product in the line 134 is diluted with substantial amounts of nitrogen and/or oxygen gas. Since these must be separated in the condenser 177, some residual chlorine remains in the oxygen depleted air and is discarded unless used for alternative purposes as previously described.

Assuming most conservatively, that sixty percent conversion of hydrogen chloride from the furnace 110 is achieved with a feed ratio of 3.5 moles of hydrogen chloride per mole of oxygen, the effluent gas leaving the salt contactor 132 would contain by volume about:

| | |
|---|---|
| 26.5% | $Cl_2$ |
| 26.5% | $H_2O$ |
| 35.0% | HCl |
| 12.0% | $O_2$ |

After removal of unconverted hydrogen chloride and water in the condenser 136 and acid scrubber 144 the remaining gas stream in line 150 would have a composition by volume of about:

| | |
|---|---|
| 69.0% | $Cl_2$ |
| 31.0% | $O_2$ |

If it is desired that the final gas stream have a lower percentage of oxygen it is possible to increase the ratio of hydrogen chloride to oxygen entering the salt contactor thereby producing additional hydrogen chloride but less oxygen in the effluent gas which leaves the contactor. Because hydrogen chloride is easily removed from the effluent gas stream, the ratio of chlorine to oxygen leaving the sulfuric acid scrubber can be increased without substantially increasing the size of the condenser 136.

If, in the same system, air were used as the oxidizing gas, the following would be an estimate of the composition by volume of the effluent gas leaving the salt contactor:

| | |
|---|---|
| 13.2% | $Cl_2$ |
| 13.2% | $H_2O$ |
| 17.6% | HCl |
| 6.0% | $O_2$ |
| 50.0% | $N_2$ |

Again, these figures are based on a conservative sixty percent conversion of HCl from the furnace 110. After treatment in condenser 136 and the acid scrubber 144 to remove steam and unreacted hydrogen chloride, the effluent gas would, by volume, contain about:

| | |
|---|---|
| 19.0% | $Cl_2$ |
| 8.6% | $O_2$ |
| 72.4% | $N_2$ |

EXAMPLE 2

A series of experiments was conducted to determine whether efficient conversion of hydrogen chloride from the furnace 110 to chlorine could be accomplished according to the embodiment of the present invention. In these experiments a Vycor vessel having a 1.4 inch inside diameter was used to contain the molten catalyst mixture to a depth of approximately nine inches. The catalyst mixture consisted of 80 weight percent $K_2S_2O_7$, 10 weight percent $K_2SO_4$ and 10 weight percent of $V_2O_5$. Metered streams of hydrogen chloride and air were combined and then dispersed into the molten catalyst mixture by means of a Pyrex frit. The effluent gas leaving the vessel was scrubbed with a KI solution to remove the chlorine formed and any residual HCl present. The ratio of hydrogen chloride to oxygen was held as close to 3.5 as possible during each run so that a slight excess of oxygen was present. Each run was one hour long. At the conclusion of each run, the total chlorine formed was determined by titrating the free iodine in the scrubber solution with sodium thiosulfate. The amount of unreacted hydrogen chloride was determined by titrating the scrubber solution with sodium hydroxide.

The results of the various runs are presented in Table II. As these results show, substantial yields were obtained even though conditions were not optimized and the experimental apparatus was quite simple. The results are even more impressive when it is considered that the reported HCl conversions represent up to eighty-four percent of the theoretical thermodynamic conversion.

TABLE II

| | | | Conversion of HCl to Chlorine Using Air | | | |
|---|---|---|---|---|---|---|
| Run No. | Reaction Temp (°C.) | Gas Flow (cc/min)[a] | HCl—O$_2$ Ratio | Estimated Residence Time (seconds) | Theoretical HCl Conversion (%)[b] | Experimental HCl Conversion (%)[c] | Yield (%)[d] |
| 1 | 375 | 14 | 3.6 | 5 | 77 | 65 | 84 |
| 2 | 375 | 66 | 3.5 | 1 | 77 | 62 | 81 |
| 3 | 450 | 20 | 3.2 | 3 | 51 | 33 | 65 |
| 4 | 450 | 66 | 3.5 | 0.9 | 51 | 24 | 47 |
| 5 | 450 | 130 | 3.5 | 0.48 | 51 | 34 | 67 |
| 6 | 525 | 14 | 3.6 | 5 | 42 | 26 | 62 |
| 7 | 525 | 66 | 3.5 | 0.8 | 42 | 28 | 67 |
| 8 | 525 | 130 | 3.5 | 0.45 | 42 | 29 | 69 |

[a] Average gas flow of combined hydrogen chloride and air at standard temperature and pressure
[b] Theoretical thermodynamic conversion
[c] %HCl Conversion = (g Cl$_2$) (100)/(g Cl$_2$ + g residual HCl)
[d] Experimental conversion divided by theoretical conversion While I have shown and described preferred embodiments of my invention, it will be apparent to those skilled in the art that changes and modifications may be made without departing from my invention in its broader aspects. I therefore intend the appended claims to cover all such changes and modifications as fall within the true spirit and scope of my invention.

I claim:

1. A process for producing elemental chlorine from a chloride salt comprising:
   reacting, in a first zone, a chloride salt with sulfuric acid at an elevated temperature sufficient to produce hydrogen chloride gas;
   recovering the evolved hydrogen chloride; and
   contacting, in a second zone,
   a. the hydrogen chloride,
   b. a molten salt mixture, and
   c. a non-gaseous oxygen compound capable of reacting with said hydrogen chloride to produce elemental chlorine and water,
   said contacting occurring in the substantial absence of an oxygen-bearing gas and at an elevated temperature sufficient to sustain a reaction between said oxygen compound and said hydrogen chloride to produce a gaseous effluent stream which contains steam and chlorine and which is substantially free of gaseous oxygen.

2. A process according to claim 1 further comprising:
   separating said effluent stream from said salt mixture and oxygen compound after said contacting; and
   contacting, in a third zone, the separated oxygen compound with an oxygen-bearing gas to regenerate said oxygen compound so that said salt mixture and oxygen compound may again be used for contacting said hydrogen chloride.

3. A process according to claim 2 wherein said oxygen-bearing gas comprises air.

4. A process according to claim 1 wherein said oxygen compound is selected from those compounds which, after reaction with said hydrogen chloride, leave a reaction product which is soluble in said salt mixture and which, when dissolved in said salt mixture, will react with oxygen in an oxygen-bearing gas contacted therewith to regenerate said oxygen compound.

5. A process according to claim 4 wherein said oxygen compound comprises V$_2$O$_5$.

6. A continuous process for producing elemental chlorine and a sulfate salt from a chloride salt and sulfuric acid comprising:
   continuously feeding a chloride salt and sulfuric acid into a first zone;
   maintaining the first zone at an elevated temperature sufficient to cause the chloride salt and sulfuric acid to react and produce a sulfate salt and hydrogen chloride;
   continuously removing the sulfate salt from the first zone;
   continuously transferring the hydrogen chloride from the first zone into a second zone;
   continuously circulating a molten salt mixture comprising 10 to 20 wt. percent K$_2$SO$_4$, 65 to 70 wt. percent K$_2$S$_2$O$_7$ and 10 to 15 wt. percent V$_2$O$_5$ between the second zone and a third zone;
   in the substantial absence of an oxygen-bearing gas, contacting the hydrogen chloride with the molten salt mixture circulating through the second zone for 0.5 to 5.0 seconds;
   during the contacting, maintaining the salt mixture at a temperature between 325° C. and 425° C. to sustain a reaction between vanadium in its higher valence state (V$^{+5}$) and the hydrogen chloride so that at least a portion of the vanadium which is dissolved in the salt mixture, is reduced to a lower valence state and so that a gaseous effluent, substantially free of gaseous oxygen and containing primarily steam and chlorine gas along with unreacted hydrogen chloride, is produced;
   separating the gaseous effluent from the resulting salt mixture containing the reduced vanadium; and
   in the third zone, contacting the salt mixture containing the reduced vanadium with air at an elevated temperature sufficient to sustain a reaction between oxygen in the air and the dissolved reduced vanadium to thus regenerate the vanadium to its higher valence states so that the salt mixture may be recirculated to the second zone for contacting additional amounts of hydrogen chloride.

* * * * *